Patented Apr. 5, 1932

1,851,988

UNITED STATES PATENT OFFICE

AUSTIN A. SCOTT, OF ROCKVILLE CENTER, NEW YORK, ASSIGNOR TO NESTLE'S FOOD COMPANY, INC., OF NEW YORK, N. Y., A CORPORATION OF NEW YORK

MALTED MILK PROCESS

No Drawing. Application filed May 9, 1929. Serial No. 361,833.

My invention is in the nature of a new malted milk product, and a process for making the same, by which an extremely palatable nourishing and healthful product is made in a very attractive form, to be marketed as a confection.

The product in its present preferred form consists of a substantially spherical ball of malted milk having a dense and substantially uniform and minutely cellular structure throughout, which is as stated, extremely palatable, nourishing and healthful in character and appetizing in appearance, resists disintegration extremely well under ordinary conditions, and being free from the large superficial and internal foraminous cavities of varying size which characterize ordinary malted milk in the ordinary cake form before it is powdered, can be evenly and easily coated with chocolate or other appropriate flavoring or moisture excluding material.

In making these malted milk balls at the present time, I prefer to make the malted milk ball in the form of a syrup as usual by transforming the starch in wheat flour into maltose and dextri-maltose and combining the product with the proper proportion of concentrated milk without sugar. I obtain a better product however by using a combination which is somewhat richer than usual in maltose and dextri-maltose.

I then evaporate and concentrate the malted milk to a heavy syrup. I now prefer to effect this evaporation and concentration in a vacuum pan under a vacuum of about 25 inches and at a temperature of 135° F.

I then by continued evaporation and agitation form the syrup into a taffy of substantially homogenous texture and density with its moisture reduced to about 6% to 8%.

I now prefer to effect this in an ordinary vacuum kneader at a vacuum of about 28 inches and at a temperature of about 120° F., for a period of about two and one half to three hours.

I then incorporate air in minute and uniform subdivisions throughout the taffy mass, preferably by breaking the vacuum in the vacuum kneader and continuing the agitation for about fifteen to twenty minutes, the taffy being thereby changed from a darker to a lighter shade owing to the greater occlusion of air.

The aerated taffy thus made is then by preference poured into trays, preferably of metal, to form slabs about one inch more or less in thickness, the trays being held in a room or chamber at a temperature of about 135° F. to keep the taffy from cooling and hardening.

The mass at this stage is still in thick taffy form.

The slabs thus formed are in my present practice deposited upon a table and cut into slugs, at present preferably about ten inches in length, six inches in width and of course about one inch in thickness.

These slugs are then rolled, under about the same temperature, into sheets about three sixteenths of an inch in thickness, when it is desired, as in the present example, to form the finished product or balls about one half inch in diameter, and into proportionately thicker sheets, when larger balls are desired.

In practice I have found it desirable to pass the slugs through reducing rolls several times to maintain the sheet at the thickness desired, as the taffy tends to expand after rolling.

This rolling process assists in making the subdivisions of air minute and uniform throughout the mass.

The sheets thus formed are then divided into small squares which, to form a half inch ball for example, are about one quarter of an inch square and as stated about three sixteenths of an inch in thickness.

At present I prefer to divide the sheets into these squares by passing them through appropriate knife rolls, first longitudinally and then transversely, so that the sheets will be scored deeply but not cut through.

I then prefer to cool and harden the scored sheets either by passing them in a conveyor through a tunnel through which passes a current of cold air or by placing them on tables or shelves chilled by circulating water.

The chilled scored sheets, which are to be completely divided into cubes, should be for this purpose generally at a temperature of about 65° to 75° F., but this desirable temperature will vary somewhat according to the moisture content of the sheets and composition of the taffy.

To divide the chilled scored sheets into the desired separate cubes any appropriate method and means may be used, for example, by depositing the hardened scored sheets in a revolving container or breaker in the interior of which are fixed longitudinal members having laterally projecting arms, by which the scored sheets are divided into cubes of substantially uniform size and shape.

The next step is the expansion of these malted milk cubes into spherical balls.

To this end, the cubes are preferably evenly spaced in trays, which I now accomplish by passing them through grids perforated with properly spaced holes of a diameter or area slightly greater than the area of the cubes.

These trays are now placed on shelves heated by circulating water to a temperature of about 205° F. in a chamber under a vacuum of about twenty-eight and one half inches.

The vacuum is started slowly, the operator keeping sample trays under observation as by means of a window provided in the vacuum chamber.

The air and moisture contained in the taffy expands in the uniformly distributed minute cells of the cubes and expands the cubes slowly into substantially spherical balls under the reduced exterior pressure, to the predetermined size.

The vacuum is then increased more rapidly to and maintained at about 28 inches or more for about half an hour to hold and maintain the expansion until the ball becomes fixed, and the moisture is then reduced to about 3% or less. During this process the expansion of the air and water that have been incorporated in minute particles into the taffy, form the minute cellular interior structure, as both the heat and the vacuum are working from the outside surface of the morsel. The moisture within the morsel, which is responsible for its soft or plastic condition, is gradually drawn outward toward the surface at the same time that the cellular structure is forming.

In the manufacture of these malted milk morsels, under the combined influence of heat and vacuum three processes occur which tend to produce the self-assumed protective outer wall.

First, the more rapid evaporation of the outer surface tends to thicken and render less elastic the taffy comprising the walls of the outer cells so that these do not expand to the same degree as the inner cells.

Second, the outer cells lose their air and moisture through more rapid molecular diffusion so that these cells collapse before becoming rigid.

Third, as to those cells on the exterior which actually do expand to any large degree, the closer proximity to the heat and lower pressure cause these cells to burst and collapse back upon and therefore thicken the outer skin of the morsel.

As the peculiar crisp cell-like structure of the morsel is quite prone to absorb moisture, it is very desirable if not essential to have such an outer moisture-resisting shell which, if desired, may be further enforced by a super-moisture resisting chocolate coating. This self-assumed outer shell also prevents any such final chocolate coating from entering the interior cells, which is uneconomic.

When the morsels are being prepared for subsequent introduction into the heating and vacuum chamber by rolling and cutting, the first stages of the formation of the outer shell are started because of the peculiar moisture attracting quality of the malted milk taffy.

The vacuum is then broken and the balls preferably taken from the trays to permit cooling as quickly as possible.

The finished balls thus produced are, as stated, of straw color, brittle, of substantially uniform minutely cellular structure, smooth surfaced and almost perfectly spherical in shape. They are more resistant to moisture, breakage and disintegration than the malted milk mass as ordinarily prepared, can be easily packed and transported and are extremely appetizing in appearance, palatable, nourishing and healthful.

Owing to their compact, firm and minutely cellular structure and smooth surface, as distinguished from the large irregular cavities and foraminous structure of ordinary malted milk in cake form after ordinary evaporation and drying, these malted milk balls or bodies can be easily and permanently coated with chocolate or other protective or flavoring material before marketing.

It is evident that my new product may be made in other shapes than balls and of varying character, and that it may be produced by many variations of the specific process described, without departing from the boundaries of my invention as defined by the following claims.

I claim as my invention:—

1. The process of making a malted milk product which consists in making malted milk in syrup form, evaporating and agitating the malted milk until it forms a taffy with a small percentage of air and moisture distributed evenly therethrough in minute cells of substantially uniform size throughout, forming the uniformly aerated malted milk taffy into small hardened pieces, and expanding the small pieces by the vacuum process into small compact malted milk bodies of substantially uniform minutely cellular structure throughout.

2. The process of making a malted milk product as set forth in claim 1 in which the separate pieces of hardened malted milk are formed into cubes and the cubes expanded into small substantially spherical bodies.

3. The process of making a malted milk product as set forth in claim 1 in which the malted milk syrup is first evaporated in vacuum to form the taffy; the taffy then further evaporated and agitated in the vacuum; the vacuum broken and the agitation continued to aerate uniformly the taffy; and the taffy dried and formed into the finished product.

4. The process of making a malted milk product as set forth in claim 1 in which the aerated taffy is formed into sheets, the sheets divided into small pieces, and the small pieces expanded in vacuum into the finished product.

5. The process of making a malted milk product as set forth in claim 1, in which the aerated taffy is formed into slabs, the slabs cut into slugs, the slugs rolled into sheets, the sheets divided into hardened small pieces, and the separate small pieces expanded in vacuum into the finished product.

6. The process of making a malted milk product as set forth in claim 1 in which the aerated taffy is formed into sheets, the sheets divided by scoring, without complete severance, into small pieces, the scored sheets broken into separate small pieces and the separate small pieces expanded in vacuum into the finished product.

7. The process of making a malted milk product in which the malted milk is first made into a syrup form; the malted milk syrup then evaporated and agitated to form a uniformly aerated taffy; the aerated taffy rolled into sheets; the sheets divided into hardened small square pieces of substantially equal size, and the substantially square pieces expanded in vacuum into small compact balls.

8. The process of making a malted milk product which consists in making a malted milk in syrup form, evaporating and agitating the malted milk until it forms a taffy with air and moisture distributed evenly throughout in minute cells, and expanding these cells of air and moisture in a vacuum to form compact malted milk bodies of substantially uniform minutely cellular structure throughout.

9. The process of making a malted milk product as set forth in claim 1, in which the malted milk syrup is first evaporated in vacuum to form the taffy, the taffy further evaporated and agitated and aerated, the vacuum then applied to uniformly expand the taffy and dry and form it into the finished product.

In testimony whereof I affix my signature.

AUSTIN A. SCOTT.